UNITED STATES PATENT OFFICE.

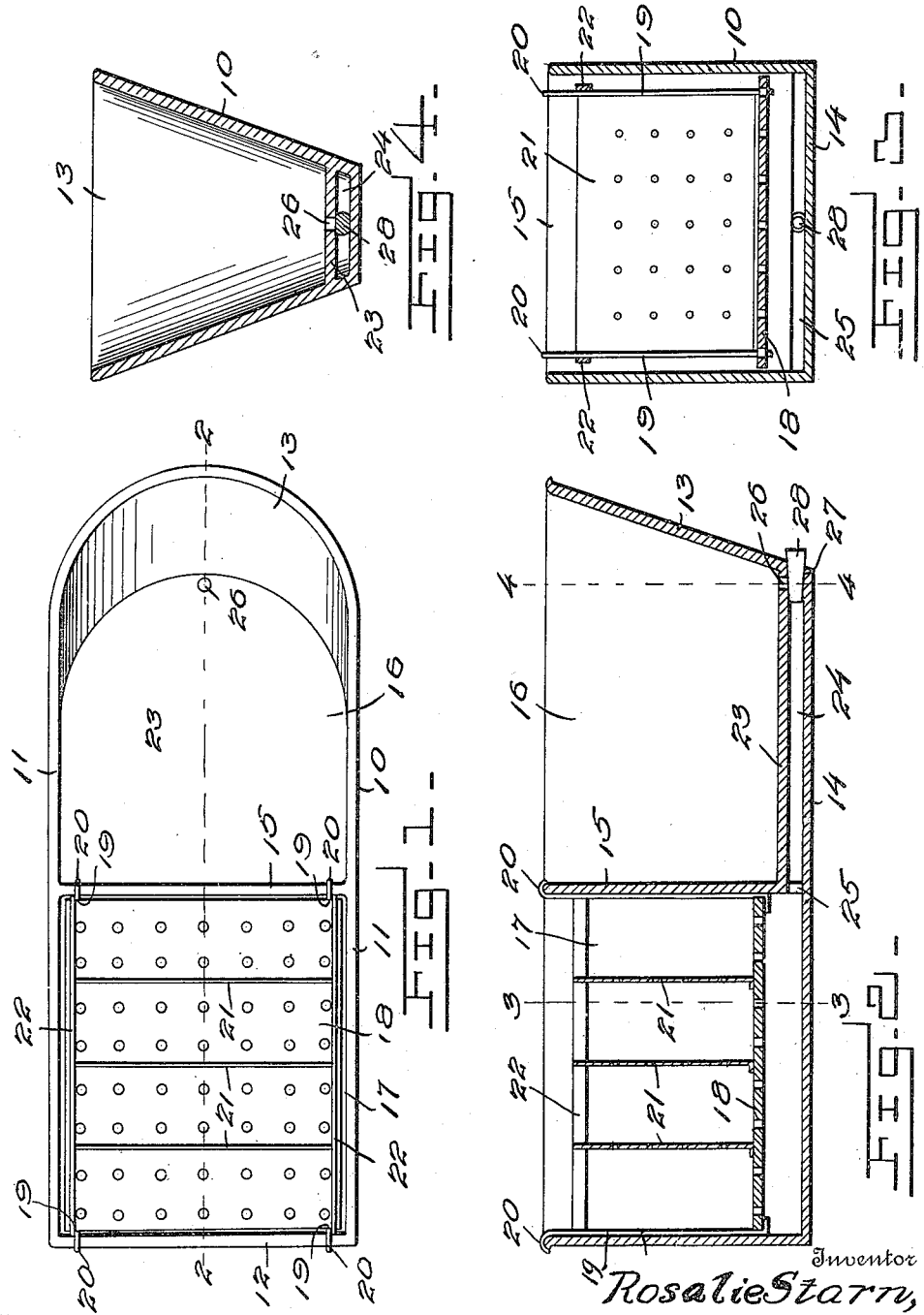

ROSALIE STARN, OF CHICAGO, ILLINOIS.

DISH-DRAINER.

993,898.  Specification of Letters Patent.  Patented May 30, 1911.

Application filed January 27, 1911. Serial No. 605,056.

*To all whom it may concern:*

Be it known that I, ROSALIE STARN, a citizen of the United States, residing at Chicago, in the county of Cook and State of Illinois, have invented certain new and useful Improvements in Dish-Drainers, of which the following is a specification.

This invention relates to improvements in dish pans.

One object of the present invention is to provide a dish pan having a draining compartment in which the dishes which have been washed may be placed.

Another object of the invention is to provide a dish pan having a chamber or compartment in which the dishes may be washed, an adjacent compartment for draining the dishes, and means for simultaneously emptying the water from the washing compartment and from the draining compartment in a single operation.

Other objects and advantages will be apparent from the following description, and it will be understood that changes in the specific structure shown and described may be made within the scope of the claims without departing from the spirit of the invention.

In the drawings: Figure 1 is a top plan view of the dish pan made in accordance with my invention, Fig. 2 is a longitudinal section on the line 2—2 of Fig. 1, Fig. 3 is a transverse section on the line 3—3 of Fig. 2, Fig. 4 is a transverse section on the line 4—4 of Fig. 2.

Referring particularly to the drawings, the dish pan comprises an elongated body 10 having parallel sides 11, a vertical end wall 12 and the inclined opposite end wall 13. The pan is also provided with the bottom 14. Extending vertically and transversely in the pan is a partition 15 dividing the pan into the washing compartment 16 and the draining compartment 17.

In the draining compartment is hung a rack which comprises the perforated bottom 18 having the bars 19 provided with hooks 20 adapted to engage over the upper edges of the end wall 12 and the partition wall 15 to suspend the perforated bottom a suitable distance from the bottom 14 of the pan. Secured to the upper face of the perforated bottom 18 and extending vertically therethrough is a series of partitions 21 so that dishes placed in this compartment may lean against the partitions to more properly drain. The upper ends of these partitions 21 are suitably secured to the longitudinally arranged strips 22 secured at their opposite ends to the bars 19.

The washing compartment 16 has a supplemental chamber 24 between it and the bottom 14, which chamber communicates with the draining compartment 17 by means of the passage 25. In the bottom 23 and adjacent the inclined wall 13 is an outlet opening 26 letting into the chamber 24. The chamber 24 has an outlet 27 in the end wall 13 between the bottoms 14 and 23, and the walls surrounding said opening are tapered inwardly to receive a tapered plug 28. It will thus be seen that the plug 28 when situated within the opening 27 closes the opening 26 to prevent water passing from the washing compartment 16, and at the same time, prevents the water from the draining compartment 17 passing through the opening 27. When it is desired to empty the pan, the plug 28 is removed, when the water from the compartment 16 will pass through the opening 26, and the water in the compartment 17 pass into the chamber 24 from the opening 25 and out through the opening 27 together with the water from the compartment 16. It will thus be noted that the plug 28 serves a double function, preventing the escape of water from the compartment 16 and also the water from the compartment 17.

In the use of the pan, the same may be placed on the usual drain boards arranged at one side of a sink so that the opening 27 will be over the sink, and when the water is to be emptied from the pan, the plug 28 is removed, and the water from both compartments allowed to run directly into the sink, thus obviating the necessity of lifting the pan to dump the water.

What is claimed is:

1. A dish pan having a washing compartment in one end and a draining compartment in the other, and a single means for controlling the out-flow of water from both compartments.

2. A dish pan having a washing compartment at one end and a draining compartment at the other, the bottom of the washing compartment being spaced from the bottom of the pan and forming therewith a chamber, said chamber having communication with the draining compartment, said dish pan and said supplemental bottom each being provided with an outlet opening in communication with said chamber, and a plug adapted to close both openings simultaneously whereby the contents of each compartment are retained therein.

In testimony whereof I affix my signature, in the presence of two witnesses.

ROSALIE STARN.

Witnesses:
    Mrs. JOHN GIBSON,
    J. C. MICHAEL.

Copies of this patent may be obtained for five cents each, by addressing the "Commissioner of Patents, Washington, D. C."